April 20, 1965     D. PETERSON     3,178,747
CULINARY SCRAPER
Filed Nov. 3, 1961

INVENTOR.
DANA PETERSON
BY Knox & Knox

United States Patent Office 3,178,747
Patented Apr. 20, 1965

3,178,747
CULINARY SCRAPER
Dana Peterson, % New Products, P.O. Box 2141,
San Diego, Calif.
Filed Nov. 3, 1961, Ser. No. 150,072
1 Claim. (Cl. 15—236)

This invention relates to improvements in hand-held type culinary scrapers which can be produced in great quantities at lower costs than other culinary scrapers. These scrapers provide a simple, efficient, effective economical device of quality for cleaning and removing incrustations from kitchen utensils, pots, and pans.

General objects of the present invention are to provide a more simple culinary scraper that eliminates a handle or holder, and to provide a durable, inexpensive, simple, efficient, effective, easy to clean and sterilize type of scraper for the purpose above named.

A more specific object of this invention is to provide such a scraper with finger gripping means formed in the surface of said scraper. Handle type scrapers have a tendency to catch and hold food particles; the handles of handle type scrapers have a tendency to shred and fall apart, also.

Another object of my invention provided by the finger gripping means enables the user to pick up the scraper from working surfaces.

Still another object of my invention provided by the finger gripping means in combination with the resiliency of the device enables the user to position the scraper more effectively so that incrustations are pushed from the surfaces by the scraping edge portions of the device whereas other conventional scrapers tend to scratch surfaces.

Yet another object of this invention, because of its compactness, enables the user to clean hard-to-get-at surfaces easily.

Other objects will appear in the course of the following specification.

My invention consists essentially in a hand-held culinary scraper formed of thin resilient sheet material having gripping means in the form of corrugations extending transversely of the sheet, all as hereinafter more particularly described and illustrated in the accompanying drawings, in which.

In the drawings, like characters of reference indicate corresponding parts in the different views.

Figure 1:
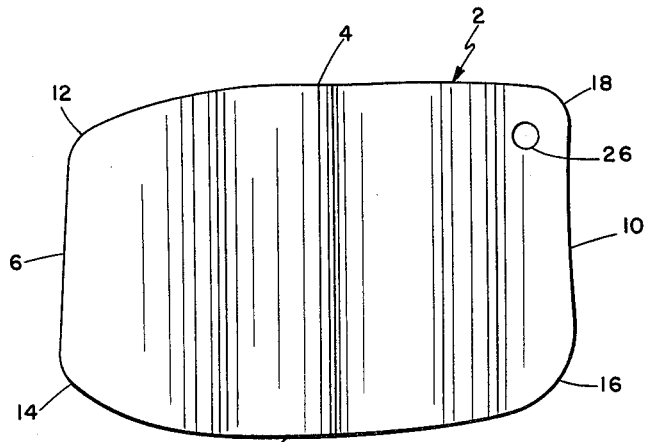
FIGURE 1 is a top plan view of the scraper.
Figure 2:
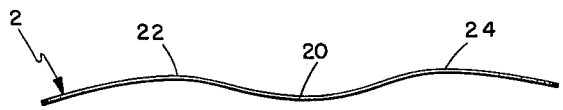
FIGURE 2 is a side view of the preferred form of a scraper constructed in accordance with my invention.
Figure 3:
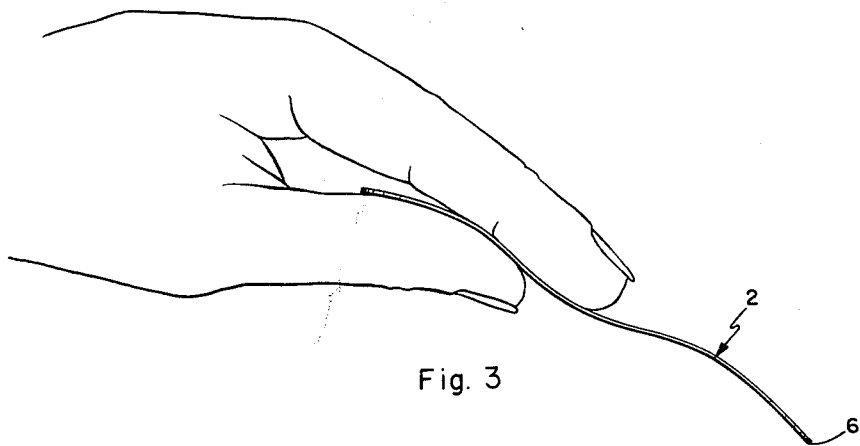
FIGURE 3 is a view showing how the scraper is gripped while in use.

My invention comprises a hand-held culinary scraper of generally rectangular plate form indicated by the reference number 2. Any suitable material may be used in forming the scraper, but I prefer to use resilient sheet material of uniform thickness such as spring stainless steel. The edges of the plate 4, 6, 8, 10 are substantially straight, opposite edges 4, 8 and 6, 10 being substantially parallel. The corners are critically shaped as at 12, 14, 16, 18 to conform very closely to the interior shape of utensils with which my scraper is intended to be used, each corner being of a slightly different configuration as clearly shown in FIG. 2. The plate 2 is further formed with gripping portions in the form of undulations or corrugations 20, 22, 24 which are of such size and shape as to receive substantial portions of the fingers in gripping relation therewith as clearly shown in FIG. 3. The corrugations 20, 22, 24 extend from one lateral edge of the plate to the other lateral edge. This facilitates picking up the scraper from a work surface since there will always be two or more edges spaced from said surface. Plate 2 is further provided with opening 26 for cooperation with a suitable hook or support.

While various changes can be made in the detailed construction, it shall be understood that such changes shall be within the spirit and scope of the present invention as defined by the appended claim.

I claim:
A hand-held culinary scraper of the character described:
comprising a generally flat rectangular piece of relatively thin resilient sheet material having scraping edge portions lying in the plane of said rectangular piece and gripping means;
said gripping means being provided by a plurality of parallel corrugations extending from one lateral edge to the other lateral edge;
said scraper being so proportioned that said corrugations are of such size and shape as to receive substantial portions of the fingers in gripping relation therewith.

References Cited by the Examiner
UNITED STATES PATENTS

| 504,376 | 9/93 | Tilman | 30—169 |
| 717,456 | 12/02 | Schiele | 15—143 X |
| 842,074 | 1/07 | Bryan | 30—169 |
| 972,400 | 10/10 | Partridge. | |
| 1,538,521 | 5/25 | Sheridan. | |
| 2,338,647 | 1/44 | Koon | 15—143 |
| 2,512,952 | 6/50 | MacMartin | 15—143 |
| 2,817,863 | 12/57 | Johns | 15—105 |

WALTER A. SCHEEL, *Primary Examiner.*

CHARLES A. WILLMUTH, *Examiner.*